Patented May 18, 1926.

1,584,951

UNITED STATES PATENT OFFICE.

RICHARD LANT, OF VIENNA, AUSTRIA, ASSIGNOR, BY MESNE ASSIGNMENTS, TO D. GESTETNER, LIMITED, OF LONDON, ENGLAND, A BRITISH COMPANY.

STENCIL SHEET.

No Drawing. Application filed November 16, 1922. Serial No. 601,415.

My invention relates to stencil-sheets of the type commonly used for autographic and typewriting duplication and particularly to stencil-sheets consisting of a fibrous and porous base (such as Japanese paper) coated or impregnated with some substance impermeable to the ink, which coating, for the purpose of preparing the stencil, is removed by the pressure of the stylus or by the impact of the types of a typewriting machine thereon on the places struck by the type or stylus, so that the ink roller or the like, through these openings made through the impermeable substance and forming the letters, can deliver ink to a sheet of paper laid under the stencil. A special object of the invention is to produce, on such paper as is commonly used for the purpose, a coating which is sufficiently strong and tough and non-brittle, so that the coated sheet can be made into a stencil without previous moistening thereof, and without adding any hygroscopic substances to the coating material.

This problem has been solved by the present invention. As the protein coated sheets are not brittle and much more durable than the wax stencil-sheets, furnishing at the same time also sharper and more uniform copies. As is usual in the prior art, glue or gelatin can be used as the protein material.

According to my invention the manufacturing of a protein coated stencil-sheet, which without preliminary moistening can be used in a perfectly dry state for preparing the stencil, is realized by adding to the coating mass substances, which without being hygroscopic and without containing water or carrying water with them, are adapted per se for diminishing the brittleness of the coagulated dry protein to such a degree, that in preparing the stencil in the type writing machine by the impact of the type only those parts of the coating mass are removed, which are directly struck by the protruding lines of the steel type forming the characters, whilst the interior spaces bordered (in some cases) all around by the lines forming the characters will not be broken out. Of the substances appropriate for such additions may by way of example be named: natural and artificial soft resins, fatty acids and fatty substances or similar esters of high molecular weight, oils, soaps, different kinds of wax and gums, hydrocarbons, natural or artificial caoutchouc mass, gutta-percha, balata and the like. For obtaining stencil-sheets efficiently operating without moistening the substances adapted for diminishing the brittleness of the coagulated protein have to amount to more than the weight of the protein contained in the coating mass. If the chosen substance to be added is soluble in a solvent, which is also capable of dissolving protein, the dissolving is done simultaneously in one operation, otherwise it is added to the solution of the protein in the form of a colloidal solution or of an emulsion or of a suspension. The coating of the open porous base, preferably paper, is effected either by dipping it into the mixed solution or else by spreading the solution on it by means of a brush or sponge. After the solvent has been expelled, the stencil-sheet is ready for use. In the case of one of the above named substances itself being not soluble in protein-solvents, a soluble product generated by transformation or conversion of such substance may be added to the solution of protein and after the formation of the coating be retransformed into the original substance. So e. g. fatty acids or sulphonated fatty acids or resins may be introduced in the form of soaps and after the coating has been effected, be transformed into the free fatty acids by spitting up. If ammonium-soaps are used, the splitting up can in a simple manner be effected by heating. According to a preferred mode of carrying out the invention any kind of ammonium-soap or a mixture of ammonium-soaps of different fatty acids is chosen as addition and an agent for coagulation and hardening the protein formaldehyde is used. The latter reacts on the ammonia forming hexamethylenetetramine, so that the coagulant at the same time liberates the free fatty acids.

A practicable formula for use in compounding such a coating (but to which the invention is not limited) is 3000 parts by weight of a 5% solution of protein, 360 parts by weight of a 50% solution of stearate of ammonium, 720 parts by weight of a 50% solution of oleate of ammonium, 3600 parts by weight of water.

The porous base is first coated with this solution. After the coating has been dried, the sheet is drawn through a strong solution of formaldehyde and then dried again. I use the term "fatty substances" in the claims to include not only the fats and oils (gylcerides) themselves but also any product showing a fatty physical consistency whatever its chemical composition may be, for instance hydrocarbons (mineral oils).

What I claim is:

1. A stencil sheet comprising a base of open porous material coated with a composition substantially free from water and hygroscopic materials and containing a protein and a proportion of non-hygroscopic softening agents, adapted to diminish the brittleness of the protein and permit the stencil sheet to be stencilized by pressure or impact without the application of moisture.

2. A stencil sheet comprising a base of open porous material coated with a composition substantially free from water and hygroscopic materials and containing a protein and a proportion of non-hygroscopic softening agents enabling the coating, without the application of external moisture thereto, to be cut by the protruding lines of the type of a typewriter in stencilizing without the areas enclosed by the said lines becoming detached from the porous material.

3. A stencil sheet comprising a base of open porous material coated with a composition substantially free from water and hygroscopic materials and containing a protein and a proportion of non-hygroscopic softening agents amounting to several times the weight of the protein.

4. A stencil sheet comprising a base of open porous material coated with a composition substantially free from water and hygroscopic materials and consisting essentially of a protein and a soap in such proportion that the stencil sheet may be stencilized by pressure or impact in the dry state.

5. A process for the manufacture of stencil-sheets which comprises first impregnating a base of open porous material with a watery solution of protein and of non-hygroscopic softening agents adapted for diminishing the brittleness of the dry coagulated protein, and after the base thus coated is dry coagulating the protein and drying the sheet again.

6. A process for the manufacture of stencil-sheets which comprises first impregnating a base of open porous material with a watery solution of protein and of a soap, after the base thus coated is dry transforming the soap into the free fatty acids and coagulating the protein, and finally drying the sheet again.

7. A process for the manufacture of stencil-sheets which comprises first impregnating a base of open porous material with a watery solution of protein and of an ammonium soap, after the base thus coated is dry transforming the soap into the free fatty acids and coagulating the protein, both by means of formaldehyde, and finally drying the sheet again.

8. A process for the manufacture of stencil-sheets which comprises first impregnating a base of open porous material with a watery solution of protein and of stearate of ammonium and oleate of ammonium, after the base thus coated is dry transforming the soap into the free fatty acids and coagulating the protein by drawing the sheet through a solution of formaldehyde, and finally drying the sheet again.

9. A stencil sheet for use in duplicating manuscript and typewritten documents, drawings and the like, comprising a stencil layer in the form of a disperse system including a gelatinized organic colloid deposited from an aqueous medium and an oily body as the main tempering agent.

10. A stencil sheet for use in duplicating manuscript and typewritten documents, drawings and the like, comprising a stencil layer in the form of a disperse system including a gelatinized organic colloid deposited from an aqueous medium, an oily body as the main tempering agent and an agent adapted to secure the desired degree of dispersion of the oily body in the stencil layer.

11. The process of forming stencil sheets which comprises applying to a sheet forming a porous support, an emulsion from which volatile organic solvents are absent, comprising a gelatinized organic colloid dispersed in an aqueous medium, and an oily body in a proportion considerably in excess of the said colloid and functioning as the main tempering agent.

12. A stencil sheet for use in duplicating manuscript and typewritten documents, drawings and the like, comprising a stencil layer in the form of a disperse system including a gelatinized organic colloid deposited from an aqueous medium and a higher fatty acid in the free state as the main tempering agent.

13. A stencil sheet for use in duplicating manuscript and typewritten documents, drawings and the like, comprising a stencil layer in the form of a disperse system including a gelatinized organic colloid deposited from an aqueous medium and an oily body as the main tempering agent, such tempering agent being present in amount sufficient to greatly diminish the brittleness of said organic colloid.

14. A stencil sheet for use in duplicating manuscript and typewritten documents, drawings and the like, comprising a stencil layer in the form of a disperse system including a gelatinized organic colloid deposited from an aqueous medium, an oily body as the main tempering agent, and an agent adapted to secure the desired degree of dispersion of the oily body in the stencil layer, such tempering agent being present in amount sufficient to greatly diminish the brittleness of said organic colloid.

15. The process of forming stencil sheets which comprises applying to a sheet forming a porous support, an emulsion from which volatile organic solvents are absent, comprising a gelatinized organic colloid dispersed in an aqueous medium, and an oily body in a proportion considerably in excess of the said colloid and functioning as the main tempering agent, such tempering agent being present in amount sufficient to greatly diminish the brittleness of said organic colloid.

16. A stencil sheet for use in duplicating manuscript and typewritten documents, drawings and the like, comprising a stencil layer in the form of a disperse system including a gelatinized organic colloid deposited from an aqueous medium and a higher fatty acid in the free state as the main tempering agent, such tempering agent being present in amount sufficient to greatly diminish the brittleness of said organic colloid.

In testimony whereof I have affixed my signature.

RICHARD LANT.